US012128433B2

(12) United States Patent
Krutskevych

(10) Patent No.: US 12,128,433 B2
(45) **Date of Patent: *Oct. 29, 2024**

(54) POP-OUT SPRINKLER WITH VACUUM ACTUATED PUSH-BACK

(71) Applicant: Marioff Corporation Oy, Vantaa (FI)

(72) Inventor: Nazar Krutskevych, Pomorske (PL)

(73) Assignee: MARIOFF CORPORATION OY, Vantaa (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,786

(22) Filed: Jul. 20, 2023

(65) Prior Publication Data

US 2023/0356250 A1 Nov. 9, 2023

Related U.S. Application Data

(63) Continuation of application No. 16/744,590, filed on Jan. 16, 2020, now Pat. No. 11,745,210.

(30) Foreign Application Priority Data

Jan. 16, 2019 (EP) .................................... 19397502

(51) Int. Cl.
*B05B 15/72* (2018.01)
*A62C 35/02* (2006.01)
(Continued)

(52) U.S. Cl.
CPC .............. *B05B 15/72* (2018.02); *A62C 35/62* (2013.01); *A62C 35/68* (2013.01); *A62C 37/09* (2013.01);
(Continued)

(58) Field of Classification Search
CPC ....... A62C 35/023; A62C 35/58; A62C 35/60; A62C 35/62; A62C 35/64; A62C 35/645;
(Continued)

(56) References Cited

U.S. PATENT DOCUMENTS 817,911 A 4/1906 Grinnell
5,320,138 A 6/1994 Ferlitch, Jr.
(Continued)

FOREIGN PATENT DOCUMENTS

CN 2346509 11/1999
CN 1442632 A 9/2003
(Continued)

OTHER PUBLICATIONS

European Patent Office, Extended European Search Report, Application No. 19397502.6-1113, issued Jul. 15, 2019 (7 pp.).

*Primary Examiner* — Darren W Gorman
(74) *Attorney, Agent, or Firm* — CANTOR COLBURN LLP

(57) ABSTRACT

Disclosed is a sprinkler system including a controller, wherein when the sprinkler system is in a pressurized mode, the controller is configured for: rendering a first determination to transition the sprinkler system to a standby mode, and executing a first communication with a vacuum pump based on the first determination, the first communication directing the vacuum pump to activate, whereby fluid is drained from the sprinkler system.

14 Claims, 2 Drawing Sheets

(51) Int. Cl.

| | |
|---|---|
| ***A62C 35/62*** | (2006.01) |
| ***A62C 35/68*** | (2006.01) |
| ***A62C 37/09*** | (2006.01) |
| ***A62C 37/14*** | (2006.01) |
| ***A62C 37/21*** | (2006.01) |

(52) U.S. Cl.
CPC ............ *A62C 37/21* (2013.01); *A62C 35/023* (2013.01); *A62C 37/14* (2013.01)

(58) Field of Classification Search
CPC ......... A62C 35/68; A62C 37/09; A62C 37/11; A62C 37/14; A62C 37/21; B05B 15/72
See application file for complete search history.

(56) References Cited

U.S. PATENT DOCUMENTS

| | | | | |
|---|---|---|---|---|
| 5,921,322 | A | 7/1999 | Bonfield et al. | |
| 6,588,512 | B2 | 7/2003 | Sundholm | |
| 6,715,561 | B2 | 4/2004 | Franson | |
| 8,776,903 | B2 | 7/2014 | Jimenez et al. | |
| 11,097,139 | B1 * | 8/2021 | Shen | G01M 3/2807 |
| 2006/0272830 | A1 | 12/2006 | Fima | |
| 2011/0000685 | A1 * | 1/2011 | Matsuoka | A62C 35/68 169/17 |
| 2018/0056102 | A1 * | 3/2018 | Bodemann | A62C 35/60 |
| 2018/0093116 | A1 | 4/2018 | Quan | |
| 2020/0101336 | A1 * | 4/2020 | Bodemann | A62C 35/68 |

FOREIGN PATENT DOCUMENTS

| | | | |
|---|---|---|---|
| CN | 2671619 | | 1/2005 |
| CN | 2680303 | | 2/2005 |
| CN | 201129505 | | 10/2008 |
| CN | 101584917 | A | 11/2009 |
| CN | 105771129 | A | 7/2016 |
| CN | 106715983 | A | 5/2017 |
| CN | 106983974 | A | 7/2017 |
| CN | 206342827 | | 7/2017 |
| CN | 108644820 | A | 10/2018 |
| JP | 631759 | | 4/1994 |
| JP | 2010063531 | | 3/2010 |
| JP | 2010184000 | A * | 8/2010 |
| KR | 2017115040 | | 10/2017 |
| WO | 9830284 | | 7/1998 |
| WO | 03062673 | A1 | 7/2003 |

* cited by examiner

POP-OUT SPRINKLER WITH VACUUM ACTUATED PUSH-BACK

CROSS-REFERENCE TO RELATED APPLICATIONS

This application is a continuation of U.S. patent application Ser. No. 16/744,590 filed Jan. 16, 2020, which claimed the benefit of European Patent Application No. 19397502.6 filed Jan. 16, 2019, the disclosure of each of which is incorporated herein by reference in its entirety.

BACKGROUND

The embodiments herein relate to a pop-out fire sprinkler and more specifically to a pop-out fire sprinkler with vacuum actuated push-back.

In automatic fire suppression systems, manual push back of pop-out fire sprinklers creates risk of cracks to frangible bulbs. In addition manual push-back operations may be time consuming in field applications.

BRIEF SUMMARY

Disclosed is a sprinkler system comprising a controller, wherein when the sprinkler system is in a pressurized mode, the controller is configured for: rendering a first determination to transition the sprinkler system to a standby mode, and executing a first communication with a vacuum pump based on the first determination, the first communication directing the vacuum pump to activate, whereby fluid is drained from the sprinkler system.

In addition to one or more of the above disclosed features or as an alternate, the system comprises a sprinkler head, wherein when the sprinkler system is in the pressurized mode, the sprinkler head is pressurized with the fluid.

In addition to one or more of the above disclosed features or as an alternate, the sprinkler head is a pendant sprinkler head.

In addition to one or more of the above disclosed features or as an alternate, the sprinkler head is a frangible bulb pendant head.

In addition to one or more of the above disclosed features or as an alternate, the sprinkler head is a concealed pendant head.

In addition to one or more of the above disclosed features or as an alternate, when the sprinkler system is in the pressurized mode, the sprinkler head is deployed, and when the vacuum pump is activated, vacuum pressure retracts the sprinkler head.

In addition to one or more of the above disclosed features or as an alternate, when the sprinkler system is in the standby mode, the controller is configured for rendering a second determination to transition the sprinkler system to the pressurized mode, and executing a second communication with a shutoff valve based on the second determination, the second communication directing the shutoff valve to energize, whereby pressurized gas pressurizes the fluid and the fluid then pressurizes the sprinkler system.

In addition to one or more of the above disclosed features or as an alternate, the shutoff valve connects a first vessel with a second vessel, the first vessel containing gas and the second vessel containing fluid, and in standby mode the first vessel is at a higher pressure than the second vessel.

In addition to one or more of the above disclosed features or as an alternate: the first vessel is fluidly connected to an upstream side of the shutoff valve; and the second vessel, the sprinkler head and the vacuum pump are is fluidly connected to a downstream side of the shutoff valve.

In addition to one or more of the above disclosed features or as an alternate: the second vessel is fluidly connected to the upstream side of the sprinkler head; and the vacuum pump is fluidly connected to the downstream side of the sprinkler head.

BRIEF DESCRIPTION OF THE DRAWINGS

The present disclosure is illustrated by way of example and not limited in the accompanying figures in which like reference numerals indicate similar elements.

DETAILED DESCRIPTION

The following figures illustrate technical features associated with one or more disclosed embodiments. Process steps disclosed hereinafter may be sequentially numbered to facilitate discussion of one or more disclosed embodiments. Such numbering is not intended to identify a specific sequence of performing such steps or a specific requirement to perform such steps unless expressly indicated.

Figure 1:
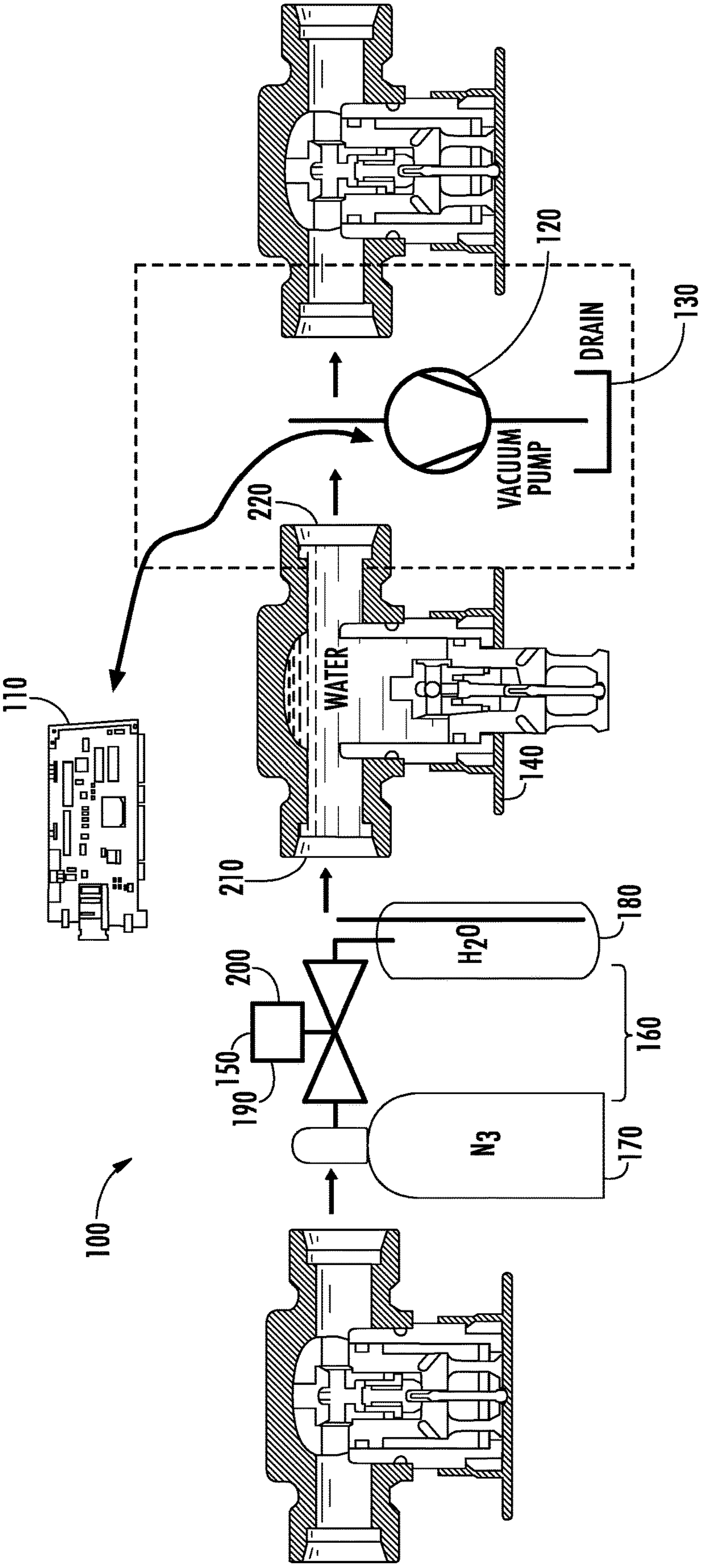
FIG. 1 is a schematic illustration of a sprinkler system according to embodiments of the present disclosure.
Figure 2:
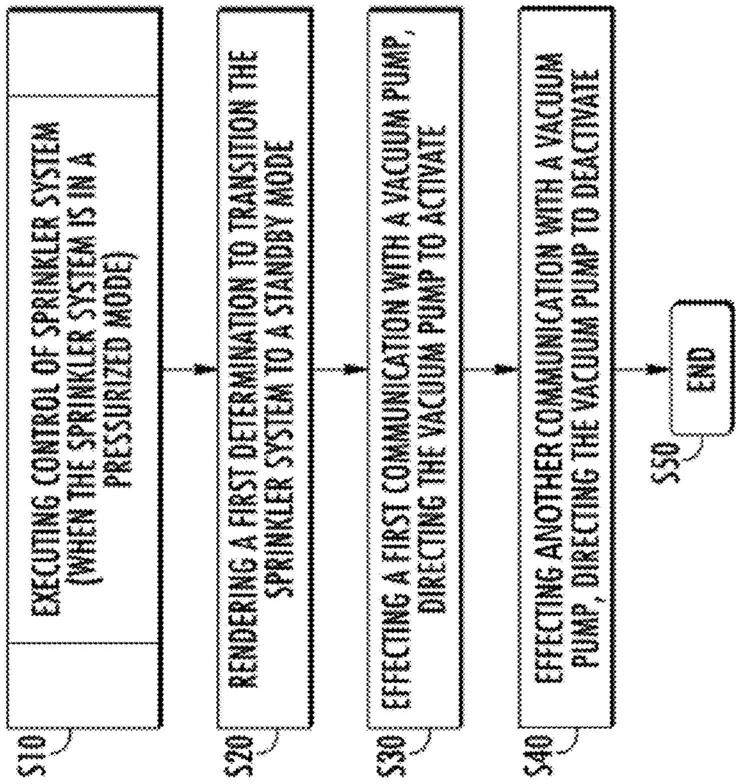
FIGS. 2-3 illustrate various process steps that may be employed by embodiments of the present disclosure.

Turning to FIGS. 1 and 2, disclosed is a sprinkler system 100 that may comprise a controller 110. The controller 110 may be configured for executing step S10 of executing control of the sprinkler system 100. Step S10 may include rendering one or more determination and effecting one or more communications with one or more system components.

In one embodiment, the sprinkler system 100 is in a pressurized mode, and step S10 may include the controller 110 being configured for executing step S20 of rendering a first determination to transition the sprinkler system 100 to a standby mode. The controller 110 may be further configured for executing step S30 of effecting a first communication with a vacuum pump 120 based on the first determination. The first communication with the vacuum pump 120 may include directing the vacuum pump 120 to activate. Once the vacuum pump 120 is activated, fluid is drained from the sprinkler system 100, for example in a drain 130. Once the fluid is drained from the sprinkler system 100, the controller 110 may execute step S40 of effecting another communication with the vacuum pump 120, directing (i.e., instructing) the vacuum pump 120 to deactivate. If no other controlling determinations are being made, the controller 110 may execute step S50 of ending the process that initiated at step S10.

In one embodiment, the sprinkler system 100 may include a sprinkler head 140. When the sprinkler system 100 is in the pressurized mode, the sprinkler head 140 may be pressurized with the fluid. In one embodiment, the sprinkler head 140 may be a pendant sprinkler head. In one embodiment the sprinkler head 140 may be a frangible bulb pendant head. In one embodiment the sprinkler head 140 may be a concealed pendant head. In such embodiment, when the sprinkler system 100 is in the pressurized mode, the sprinkler head 140 may be deployed. In addition, in such embodiment, when the vacuum pump 120 is engaged, vacuum pressure may retract the sprinkler head 140 to a concealed configuration. In other words, the vacuum pressure automatically pushes-back the deployed sprinkler head 140.

Figure 3:
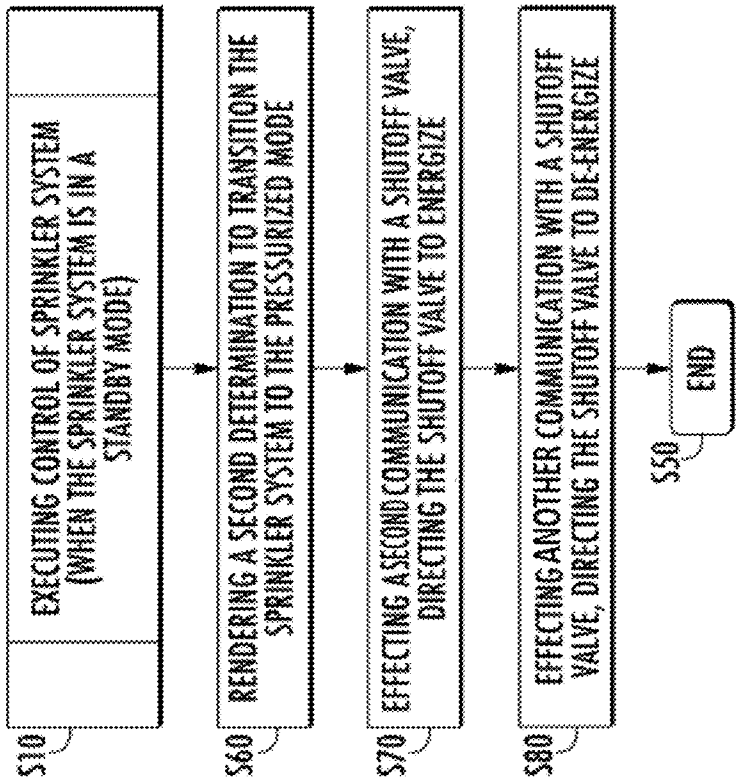

Turning to FIG. 3, in one embodiment, when the sprinkler system 100 is in the standby mode and the controller 110 is executing step S10, the controller 110 may be configured for executing step S60 of rendering a second determination to transition the sprinkler system 100 to the pressurized mode. The controller 110 may be configured for executing step S70 of effecting a second communication with a shutoff valve 150 based on the second determination. The second communication with the shutoff valve 150 may include directing the shutoff valve 150 to energize. Once the shutoff valve 150 is energized, pressurized gas such a nitrogen may pressurize the fluid such as water, and the fluid may then pressurize the sprinkler system 100. In an emergency situation, the shutoff valve 150 may remain energized. Alternatively, if a system test were being performed when executing step S10 in this embodiment, the controller 110 may be configured for executing step S80 of effecting another communication with the shutoff valve 150, directing it to de-energize. As previously indicated, if no other controlling determinations are being made, the controller 110 may execute step S50 of ending the process that initiated at step S10.

With further reference to FIG. 1, the shutoff valve 150 may connect a plurality of vessels 160, including a first vessel 170 and a second vessel 180. The first vessel 170 may contain gas and the second vessel 180 may contain fluid for suppressing fire. In standby mode, the first vessel 170 may be at a higher pressure than the second vessel 180. In one embodiment the first vessel 170 may be fluidly connected to an upstream side 190 of the shutoff valve 150. In such embodiment the second vessel 180, the sprinkler head 140 and the vacuum pump 120 may be fluidly connected to a downstream side 200 of the shutoff valve 150. In one embodiment the second vessel 180 may be fluidly connected to an upstream side 210 of the sprinkler head 140. In such embodiment the vacuum pump 120 may be fluidly connected to a downstream side 220 of the sprinkler head 140.

As disclosed above, the disclosed embodiments provide an automated push-back system and method for pop-out fire sprinklers that may utilized a vacuum pump to create vacuum pressure for retracting a deployed sprinkler head. The disclosed embodiments may provide utilizing the vacuum pump to drain piping networks that feed pop-out fire sprinklers. As a result, the disclosed embodiments may avoid delays and damage which may be associated with manual operation of the sprinkler system. The disclosed embodiments may provide for (i) reducing time required for performing periodical inspections of pop-out fire sprinklers in the field; (ii) eliminating challenges created from human factor during push-back procedures executed in the field; and (iii) providing a reliable drain and pushback method for engaging pop-out sprinklers located in access-challenged areas.

With respect to the controller and components communicating therewith as described in above disclosed embodiments, such embodiments can be implemented in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sprinkler system comprising:

a shutoff valve;

a sprinkler head downstream of the shutoff valve;

a vacuum pump downstream of the sprinkler head;

a drain downstream of the vacuum pump; and a controller operationally coupled to the vacuum pump, wherein:

the sprinkler head is in a deployed position when the sprinkler system is pressurized, and the sprinkler head is in a retracted position when the vacuum pump is engaged; and the controller is configured for:

rendering a first determination, when the sprinkler system is in a pressurized mode, to transition the sprinkler system to a standby mode; and executing a first communication with the vacuum pump based on the first determination, the first communication directing the vacuum pump to activate, whereby fluid is drained from the sprinkler system into the drain.

2. The sprinkler system of claim 1, wherein:

when the sprinkler system is in the pressurized mode, the sprinkler head is pressurized with the fluid.

3. The sprinkler system of claim 1, wherein:

when the sprinkler system is in the standby mode, the controller is configured for:

rendering a second determination to transition the sprinkler system to the pressurized mode; and executing a second communication with the shutoff valve based on the second determination, the second communication directing the shutoff valve to energize, whereby pressurized gas pressurizes the fluid, and the fluid then pressurizes the sprinkler system.

4. The sprinkler system of claim 1, wherein the sprinkler head is a concealed frangible bulb pendant sprinkler head.

5. The system of claim 1, further comprising:

a first vessel with a second vessel connected to the shutoff valve, the first vessel containing gas, and the second vessel containing fluid.

6. The sprinkler system of claim 5, wherein:

the first vessel is fluidly connected to an upstream side of the shutoff valve.

7. The sprinkler system of claim 5, wherein:

in the standby mode the first vessel is at a higher pressure than the second vessel.

8. A method of controlling a sprinkler system with a controller, wherein:

the sprinkler system includes:

a shutoff valve;

a sprinkler head downstream of the shutoff valve;

a vacuum pump downstream of the sprinkler head; and a drain downstream of the vacuum pump, wherein:

the controller is operationally coupled to the vacuum pump;

the sprinkler head is in a deployed position when the sprinkler system is pressurized, and the sprinkler head is in a retracted position when the vacuum pump is engaged; and the method comprises the controller:

rendering a first determination, when the sprinkler system is in a pressurized mode, to transition the sprinkler system to a standby mode, and executing a first communication with the vacuum pump based on the first determination, the first communication directing the vacuum pump to activate, whereby fluid is drained from the sprinkler system into the drain.

9. The method of claim 8, wherein:

when the sprinkler system is in the pressurized mode, the sprinkler head is pressurized with the fluid.

10. The method of claim 8, wherein:

when the sprinkler system is in the standby mode, the controller is configured for:

rendering a second determination to transition the sprinkler system to the pressurized mode; and executing a second communication with the shutoff valve based on the second determination, the second communication directing the shutoff valve to energize, whereby pressurized gas pressurizes the fluid, and the fluid then pressurizes the sprinkler system.

11. The method of claim 8, wherein: the sprinkler head is a concealed frangible bulb pendant sprinkler head.

12. The method of claim 8, wherein:

the sprinkler system further comprises a first vessel with a second vessel connected to the shutoff valve, the first vessel containing gas, and the second vessel containing fluid.

13. The method of claim 12, wherein:

the first vessel is fluidly connected to an upstream side of the shutoff valve.

14. The method of claim 12, wherein:

in the standby mode the first vessel is at a higher pressure than the second vessel.

* * * * *